Jan. 7, 1969  J. E. VAUGHAN  3,420,452
LIQUID MANURE SPREADER
Filed Oct. 6, 1966  Sheet 1 of 2

INVENTOR
JAMES E. VAUGHAN
BY
Robert W. Beach
ATTORNEY

United States Patent Office 3,420,452
Patented Jan. 7, 1969

3,420,452
LIQUID MANURE SPREADER
James E. Vaughan, Elma, Wash., assignor to Vaughan Co., Inc., Montesano, Wash., a corporation of Washington
Continuation-in-part of application Ser. No. 511,630, Dec. 6, 1965. This application Oct. 6, 1966, Ser. No. 584,861
U.S. Cl. 239—670
Int. Cl. B05b 9/02
6 Claims

ABSTRACT OF THE DISCLOSURE

A trailer-mounted tank of cylindrical shape has a loading port in its upper side closable by a slide. A power-driven screw extending lengthwise through the lower portion of the tank has a centrifugal vane impeller attached to its rear end which rotates in an auxiliary housing. A discharge port in the side of the housing, toward which the impeller vanes turn upward, has its external side unconfined and freely open through which the impeller can fling the liquid manure. The screw extends through an aperture in the rear wall of the tank, which aperture is smaller than the cross-sectional area of the housing but extends to the bottom of the tank and housing beneath the screw. A shield extends from the bottom of the impeller housing at its discharge opening side over the upper portion of the screw to deflect liquid into the vanes at the housing side opposite the discharge opening so that liquid cannot bypass the impeller from the discharge end of the screw to the outlet port. The shield extends from the tank rear wall aft substantially to the impeller.

This application is a coninaion-in-part of application Ser. No. 511,630, filed Dec. 6, 1965, for Liquid Manure Spreader, now abandoned. The spreader of this invention is particularly useful for liquid manure containing solid vegetable waste material in suspension, which may include straw, hay, sawdust, grass and/or leaves and, more particularly.

A principal object of this invention is to provide a spreader for such liquid manure which will be easy to operate and effective in operation. More particularly, it is an object to provide such a manure spreader which will handle such liquid manure in the form of a thick slurry in a manner to spread it evenly on a field, which will not clog readily and which, when necessary, can be cleaned without difficulty.

In such a liquid manure spreader it is an object to provide mechanism which will eject and distribute the liquid manure evenly over a wide area irrespective of the amount of manure in the spreader and which, prior to such distribution, will keep the manure mixed so that it will be of substantially homogeneous character.

A further object is to provide such a liquid manure spreader which can be adjusted quickly during operation to alter the volume of manure being discharged.

It is a further object to provide a liquid manure spreader which can be demounted readily for cleaning.

An object in providing a restricted passage between the tank and the impeller chamber is to prevent an oversupply of manure being fed into the impeller chamber while maintaining adequate mixing of the liquid manure in the tank.

Figure 1:
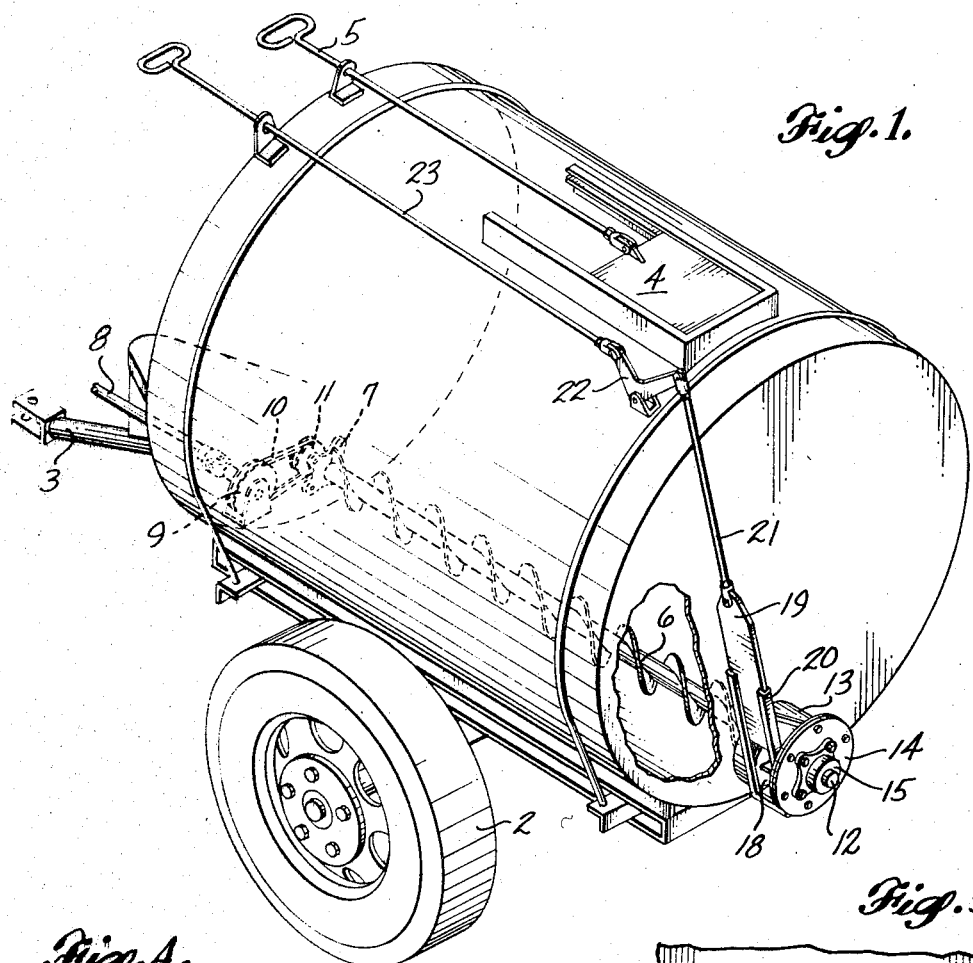
FIGURE 1 is a top perspective of a representative liquid manure spreader with parts broken away.

The liquid manure spreader of the present invention is most effective when it is of the mobile type. Because such equipment will ordinarily be used for spreading manure only a small portion of the time, it is not economical for the spreader itself to be motorized and, consequently, the spreader is illustrated as including a tank 1 mounted on a trailer chassis supported by two wheels 2 and having a tongue 3 to be attached to a tractor. As shown, the tank preferably is of cylindrical shape and may be of any desired size, but conveniently is 4 to 6 feet in diameter and 6 to 10 feet long.

Liquid manure which may contain solid vegetable waste material in suspension, such as straw, hay, sawdust, grass and/or leaves, in the form of a heavy slurry which is closable by a cover 4 guided by ways for movement between an open position and a closed position. Such cover movement can be effected by pulling or pushing rod 5 which extends along the top of the tank and has its rearward end secured to the cover and its forward end formed as a handle to be grasped by the operator so that he can pull the cover 4 forward in its ways to open the tank hatch or push the cover rearwardly into a position covering the liquid manure supply hatch.

The solid material of the manure slurry is kept mixed with the liquid in a homogeneous condition by the stirring action of a screw 6 extending lengthwise in the bottom portion of the tank 1, but preferably spaced somewhat from the bottom. This screw is in the form of a helix extending around and supported by a turning shaft. The front end of this shaft is journaled in a bearing mounted by a spider 7 on the outer surface of the front end wall of the tank, so as not to be submerged in the contents of the tank. The shaft extends through such wall so that it can be rotated by the power takeoff 8 of a tractor pulling the manure spreader trailer. Such power takeoff turns a sprocket 9 which drives a chain 10 engaged with a second sprocket 11 mounted on the front end of the shaft of screw 6.

Figure 4:
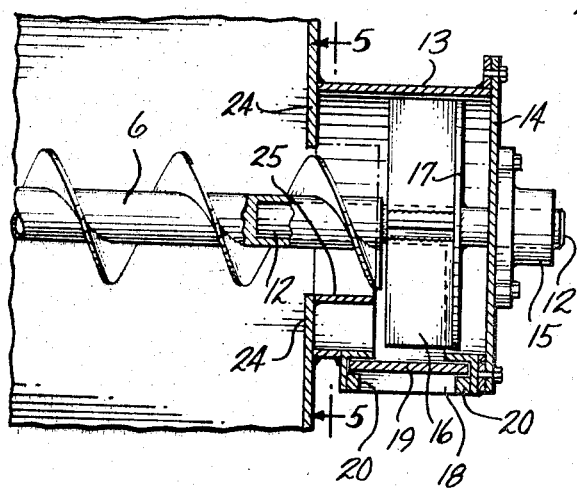
FIGURE 4 is a fragmentary section through a portion of the spreader on an enlarged scale taken along line 4—4 of FIGURE 5.

The rear end of the screw is supported by a stub axle 12 extending into a bore in the rear end of the screw, as shown in FIGURE 4. Such stub axle extends centrally and axially through an auxiliary discharge chamber formed by the housing 13 mounted on the rear end wall of the tank 1 near its bottom. This auxiliary discharge chamber housing preferably is of cylindrical shape and its rear end is closed by a removable plate 14 secured in position by cap bolts extending through its periphery and an external radial flange on the housing 13. On this closure plate is secured a bearing 15 for the stub axle 12 which is supported by a spider mount bolted to the outer side of the closure plate 14.

Figure 2:
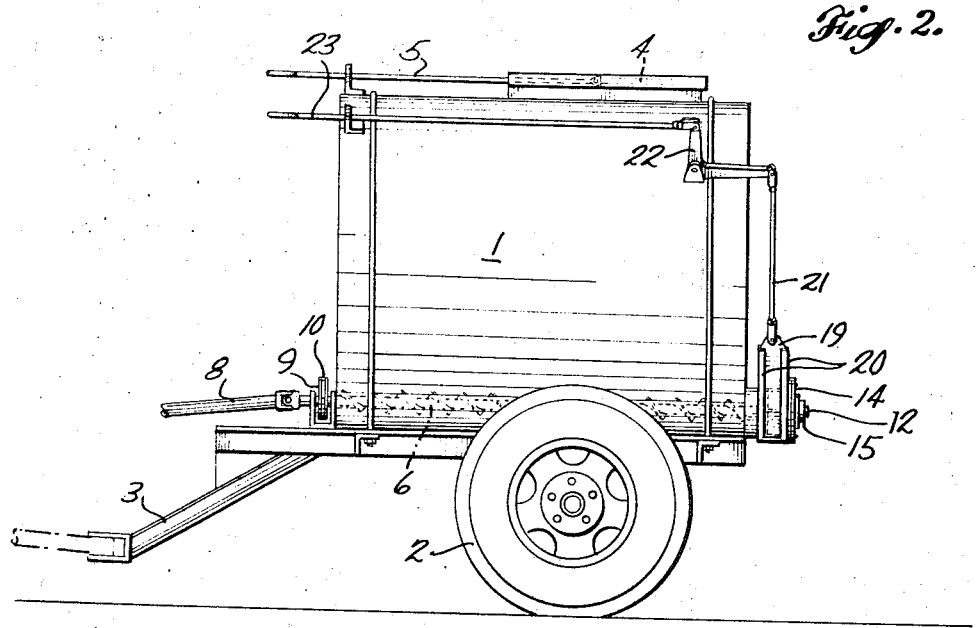
FIGURE 2 is a side elevation of the spreader and FIGURE 3 is a rear elevation of the spreader.

The stub axle 12 carries an impeller immediately behind the screw 6 including radial vanes 16 extending forwardly from a backing plate 17, which vanes and backing plate are formed integrally with, or attached permanently to, the stub axle 12, such as by welding. This centrifugal pump impeller is mounted on the stub axle directly opposite a discharge port 18 in one side of the auxiliary discharge chamber housing 13. As shown in FIGURES 1 and 4, the external side of such discharge port is unconfined, opening freely instead of being confined by some sort of discharge pipe or casing. The size of the discharge port opening can be regulated by adjustment of a gate 19 extending tangentially of the housing 13. Such gate is guided for lengthwise movement generally tangentially of the housing in channel ways 20 aligned with the front and rear sides, respectively, of the discharge port 18. Movement of such gate is effected by a push-pull rod 21 connected between its upper end and one arm of a bell crank 22 mounted on the upper side of the tank 1, as shown in FIGURES 1 and 2. To the other arm of this bell crank is attached a rod 23 extending along the upper side of the tank 1 and having a handle at its forward end that can be grasped by an operator.

Figure 5:
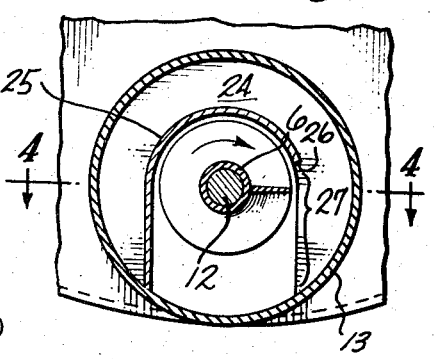
FIGURE 5 is a transverse vertical fragmentary section through a portion of the spreader taken on line 5—5 of FIGURE 4.

Communication between the lower portion of the tank 1 and the auxiliary discharge chamber within housing 13 is afforded through the restricted passage formed by the convolutions of the screw helix 6 and a passageway beneath the screw as defined by the portion 24 of the rear end wall of the tank, which projects inwardly from the top and sides of the periphery of housing 13, as shown in FIGURES 4 and 5. The cross section of the passage between the tank and the impeller chamber is considerably smaller than the cross section of the impeller chamber perpendicular to the rotative axis of the screw and the impeller. As shown in FIGURES 4 and 5, the upper portion of the margin of such passage is semicircular, lying closely adjacent to the periphery of the screw 6, while the sides of the lower portion of the passage are upright and the bottom of such passage is formed by the bottom of the tank. As seen in FIGURE 4, the impeller diameter is almost as large as the diameter of the cylindrical impeller chamber.

Figure 3:
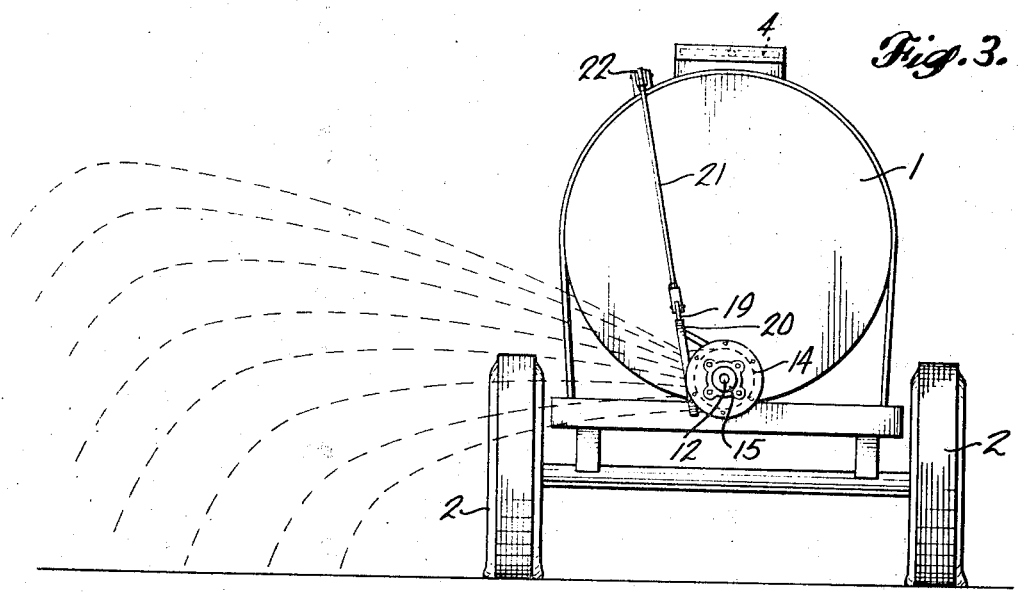

As mentioned above, the discharge port for the impeller chamber is in one upright side of such chamber, namely, the port side as seen in FIGURES 1, 4 and 5. The impeller 16, 17 and the screw 6 rotate in a clockwise direction when viewed from the rear as seen in FIGURE 5. Consequently, the blades 16 of the impeller sweep downward alongside the starboard wall of the impeller housing across the bottom and up along the port side of the housing to the discharge aperture 18 through which the liquid manure is ejected. It is desirable for such liquid manure to be ejected transversely of the screw and impeller shaft and flung by the impeller for a considerable distance as shown in FIGURE 3, rather than for the liquid manure simply to gush out of the discharge aperture to be deposited close to the tank.

If the desired area and uniformity of manure coverage is to be obtained by flinging the liquid manure from the spreader it is necessary for most of the liquid manure ejected to be given a strong impetus as it is being discharged. Such impetus is obtained in the present device by rotating the impeller at a sufficient, speed supplying liquid manure to the pockets of the impeller between its end plate 17 and its blades 16 sufficiently in advance of the pockets reaching the emptying position of the discharge aperture 18 and deterring substantial bypassing of the impeller by liquid manure.

If the impeller 16, 17 is 12 to 16 inches in diameter, rotating the impeller at a speed of approximately 1200 r.p.m. will cause the impeller blades to sling the liquid manure with satisfactory ejecting force if the liquid manure is in contact with the impeller for a length of time sufficient so that its blades can produce a substantial centrifugal force on the manure. It is important, however, that most of the liquid manure be received in a pocket of the impeller while it turns through an angle of approximately 90 degrees or more. Such lodgment of the liquid manure in the pockets of the impeller can be achieved by providing the arcuate flange shield 25 shown in FIGURES 4 and 5, which projects closely adjacent to the adjacent edges of the impeller blades 16 when they are moving from the bottom portion of the impeller housing upward past the discharge aperture.

In addition, it is desirable to obtain substantially uniform distribution of the manure slurry by the spreader irrespective of the amount of slurry in the tank 1. The hydraulic pressure of the liquid manure in the bottom of the tank will, of course, vary with the depth of the liquid in the tank. The tendency is for the greater pressure of a full tank to increase the flow of manure through the discharge aperture over that which would be discharged if the liquid level in the tank were relatively low. Without the arcuate flange shield 25 the tendency is for liquid manure to flow between the convolutions of the screw 6 through the upper portion of the passageway and through the partition 24 to gush out through the discharge aperture after much of the liquid manure has been contacted only momentarily by the tips of the impeller blades 16, or by axial flow of the liquid manure between the end portions of the impeller blades without any appreciable impetus being given to such portion of the liquid.

To prevent any appreciable quantity of liquid manure bypassing the impeller blades 16 and to afford effective action of such blades on the liquid manure the shield flange 25 should extend from the tank end wall 24 into close proximity to the adjacent edges of the impeller blades. Also, to insure that rotation of such blades produce an effective impetus on the liquid manure it is preferred that the arcuate portion of the shield 25 be located approximately midway between the root ends and the outer ends of the impeller blades. In addition, it is preferred that such shield extend over approximately one-half of the peripheral extent of the impeller chamber, at least including the discharge aperture side and the upper portion of such housing.

A shield of such size and shape will confine the flow of liquid manure entering the auxiliary discharge chamber housing 13 to flow into the central portion of the impeller at the top and side of the chamber adjacent to the discharge aperture. The liquid manure may flow into the full radial extent of the impeller at the side of the housing remote from the discharge aperture and at the bottom of the housing. Such liquid manure is caught between the radial blades 16 of the impeller, the rotatable backing plate 17 joining the edges of such blades at the side of the impeller opposite the tank and the peripheral cylindrical wall of the discharge chamber housing 13 which closely encircles the outer ends of the impeller blades. Consequently, the liquid sewage lodges briefly in the impeller pockets formed by the radial blades 16 and the backing plate 17, so that rotation of the impeller can produce centrifugal force on the liquid manure in the pockets which will impel the liquid manure toward the housing wall for ejection from the housing through the discharge aperture 18 in its port side.

Because of the shield 25, virtually all of the liquid manure discharged through the discharge aperture is given a greater or lesser impetus by the rotating impeller blades 16 so that, as indicated in FIGURE 3, good distribution of the manure is achieved for a considerable distance from the tank. Moreover, the distribution will remain substantially uniform despite the decreasing head of liquid in the tank as the spreading operation progresses.

Rotation of the screw 6 not only produces a positive supply of liquid manure from the tank to the auxiliary discharge chamber housing 13, but also serves as a valve to deter excessive flow so that the volume of flow through the passageway in the wall 24 remains generally constant for a given speed of rotation of the screw 6. While it would be possible to drive screw 6 from the wheels 2 as the trailer is hauled over the ground, it is preferred that the screw drive be independent of movement of the manure spreader so that the screw can be driven while the trailer is stationary to stir the contents of the tank for maintaining the liquid manure mixed in substantially homogeneous condition while the gate 19 controlling the opening through the discharge aperture 18 remains closed. The volume of liquid manure ejected through the discharge opening 18 can be regulated by varying the speed of rotation of the screw 6 and impeller 16, 17, which are rotative conjointly, but it is preferred that the rotative speed of this mechanism be maintained constant so that the force and trajectory of the liquid manure ejected through the discharge opening 18 will be substantially constant. The volume of manure discharged can be regulated during operation of the spreader simply by the operator moving rod 23 forward or rearward to alter the area of the discharge opening by shifting the slide gate 19 up or down.

When it is desired to clean the mechanism or the tank it is merely necessary to remove the drive pulley 11 from the front end of screw 6 and the rear cover plate 14 of the auxiliary discharge chamber housing 13. The entire screw and impeller assembly can then be withdrawn rearwardly from the tank. To install the screw and impeller assembly again the screw can be supported by engagement through the hatch in the top of the tank so that its front end can be passed through the aperture in the front wall of the tank 1 as the screw and impeller are moved forward.

I claim as my invention:

1. A liquid manure spreader comprising a tank, an impeller housing projecting from one end of said tank near the bottom thereof and having a discharge port in one side thereof, the external side of which port is unconfined and freely open, a centrifugal pump impeller rotatively mounted in said housing, a screw coaxial with said impeller and rotative therewith, extending through the lower portion of said tank substantially to said impeller and having a diameter substantially smaller than the diameter of said impeller, drive means operable to effect conjoint rotation of said screw and said impeller for moving liquid manure from said tank into said impeller housing and flinging liquid manure by said impeller from said housing through said discharge port, the inside diameter of said impeller housing being larger than the diameter of said impeller, and partition means through which said screw extends, located between said tank and said impeller housing, spaced a substantial distance from said impeller, closely embracing the upper portion of said screw and providing a passageway through said partition means beneath said screw restricting flow of liquid manure from said tank into said impeller housing to prevent excessive supply of liquid manure to said impeller.

2. The liquid manure spreader defined in claim 1, and a shield extending from the partition means substantially to the impeller to direct liquid flowing through the passage way to the central portion of the impeller.

3. The liquid manure spreader defined in claim 1, in which a shield extends over the upper portion of the screw in close proximity thereto from the partition means substantially to the impeller.

4. The liquid manure spreader defined in claim 1, in which the impeller housing has a discharge aperture adjacent to one side of the impeller and a shield extends from the partition means substantially to the impeller at such side.

5. The liquid manure spreader defined in claim 4, in which the shield further extends over the upper portion of the screw in close proximity thereto from the partition means substantially to the impeller.

6. The liquid manure spreader defined in claim 1, in which the passageway through the partition means extends downward to the bottom of the tank.

References Cited

UNITED STATES PATENTS

| 2,152,259 | 3/1939 | Humphrey. | |
| 2,602,670 | 7/1952 | Burkart | 239—687 |
| 2,959,329 | 11/1960 | Jensen | 222—178 |
| 2,965,379 | 12/1960 | Ganley | 222—177 X |
| 3,159,315 | 12/1964 | Friesen | 222—178 X |
| 3,171,658 | 3/1965 | Clark | 239—687 X |
| 3,322,429 | 5/1967 | Cervelli | 222—178 X |

FOREIGN PATENTS

| 927,954 | 5/1955 | Germany. |
| 31,118 | 5/1960 | Finland. |

ROBERT B. REEVES, *Primary Examiner.*

H. S. LANE, *Assistant Examiner.*

U.S. Cl. X.R.

222—178, 240; 239—666, 675, 687